UNITED STATES PATENT OFFICE.

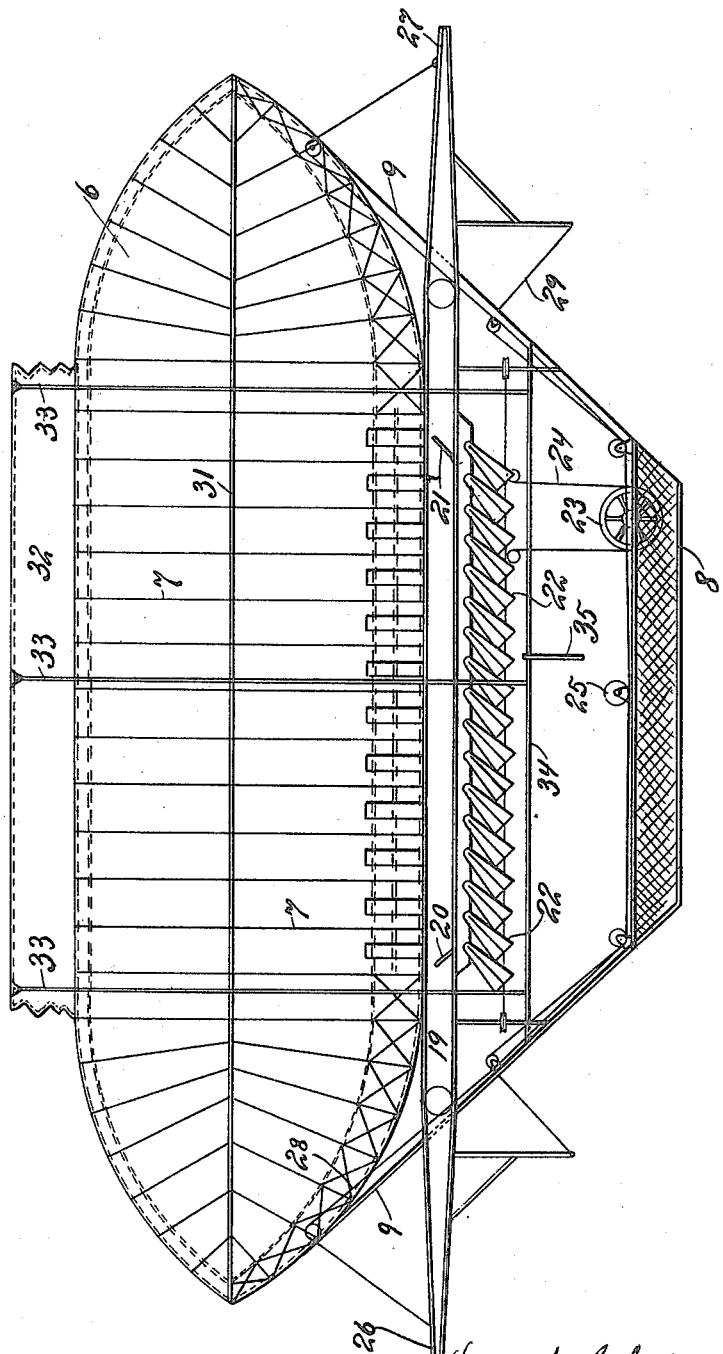

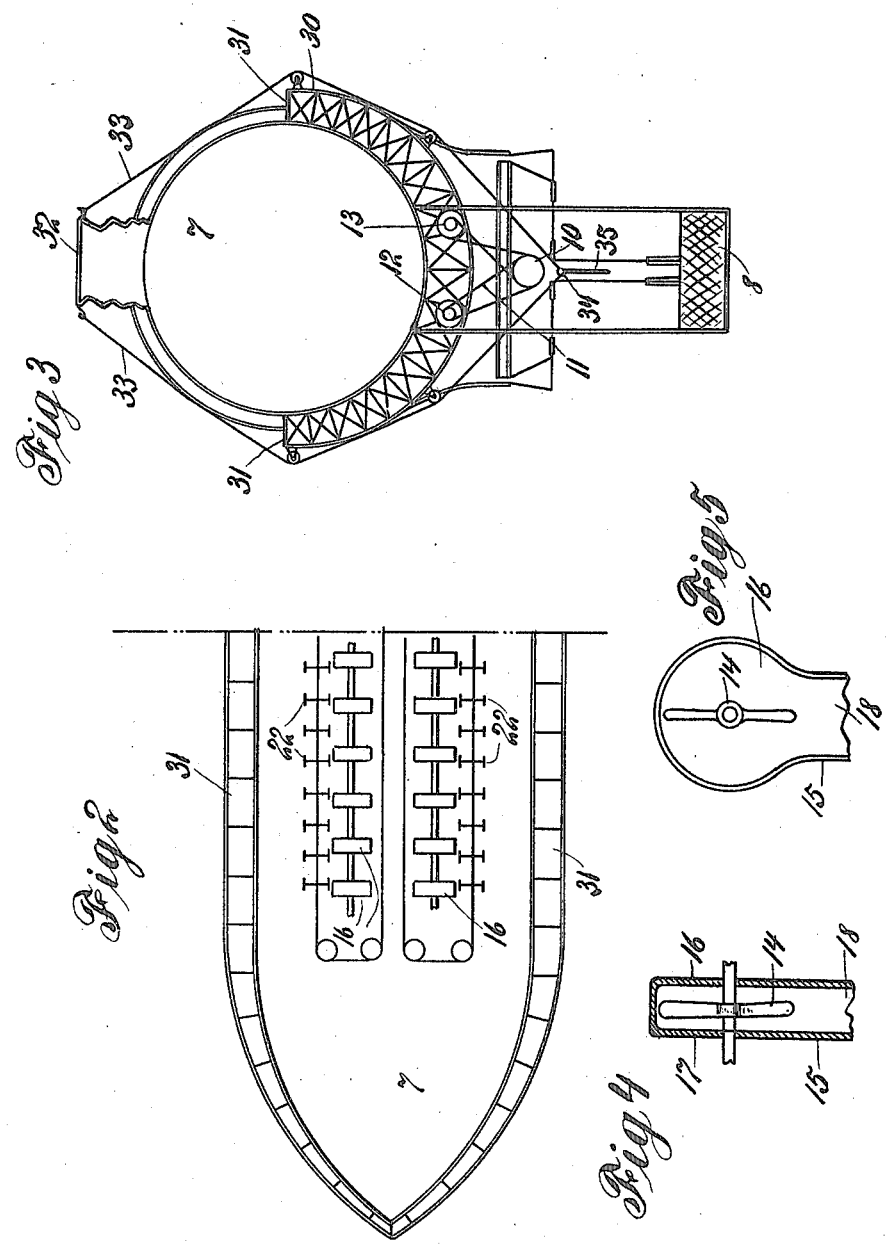

HENRY W. SCHMIDT, OF EDGEWATER, NEW JERSEY.

AERONAUTICAL APPARATUS.

1,135,056.　　　　　Specification of Letters Patent.　　Patented Apr. 13, 1915.

Application filed June 6, 1913. Serial No. 772,025.

*To all whom it may concern:*

Be it known that I, HENRY W. SCHMIDT, a citizen of the United States, residing at Edgewater, in the county of Bergen and State of New Jersey, have invented certain new and useful Improvements in Aeronautical Apparatus, of which the following is a specification, reference being had therein to the accompanying drawing.

My invention relates to improvements in aeronautical apparatus and has particular reference to what is generally well known as the lighter-than-air craft.

To this end the invention comprises means for creating and deflecting a large volume of air in motion so as to propel the machine while in flight, including means for controlling the direction of discharge of said air so as to raise or lower the machine at will.

The invention also comprises means for allowing for the expansion of the gases in the bag without the escape of the same and means for restoring these gases after the same have condensed.

In the accompanying drawings I have illustrated in Figure 1 a side elevation of a dirigible type of aircraft illustrating an application of my invention. Fig. 2 is a plan view looking down upon the left side of Fig. 1, and Fig. 3 is a cross section through the center of Fig. 1. Fig. 4 is a cross section of one of the propellers and its housing, and Fig. 5 is a view looking from right to left at Fig. 4.

6 is the bag or envelop of the dirigible which is covered with the usual netting 7 carrying the under-structure in any convenient manner.

8 is a suitable platform or carriage suspended beneath the bag in any suitable manner as by the supports 9. This platform provides sufficient accommodation for the operator, engines and other paraphernalia.

10 is a suitable pulley driven from the engine and connected by suitable means such as the belts 11 to the pulley 12 upon the parallel shafts 13 extending longitudinally beneath the bag. Upon the shafts 13 are mounted suitable propellers such as 14 each of which is suitably housed as shown to better advantage in Figs. 4 and 5 indicated by the reference character 15. When the propellers are operated the air is drawn from the back of the housing 15 through the opening 16 and strikes the front of the housing 17 which is closed, after which the air passes downwardly through the bottom 18 into the duct 19. This duct it will be observed is provided with two hinged partitions 20—21 which may be operated to close the duct 19. The lower part of the duct is open and immediately beneath the same is suitably pivoted the deflecting surfaces 22 which may be moved leftwardly as shown in Fig. 1 or which may be moved rightwardly by rotating the wheel 23 which thereupon operates the cable 24 connected to the bottom of the deflecting surfaces 22 as shown. From this it will be seen that when the motor is running the air drawn into the housings is forced by the propellers 14 into the duct 19 after which it strikes the deflecting surfaces 22. When striking these surfaces while disposed as shown in Fig. 1, the machine would of course move rightwardly, but by rotating the wheel 23 so as to shift the deflecting surfaces 22 in the opposite direction, the machine would then of course travel leftwardly. When it is desired to raise the bow or stern of the machine the wheel 25 may be rotated thereupon raising or lowering the spouts 26—27 according to the direction in which the wheel is rotated as will be more readily understood from the cable connections 28—29. By closing the hinged partitions 20—21 the entire blast of air from the combined propellers may be directed upon the deflecting surfaces 22 instead of passing longitudinally through the duct 19. This enables the operator to apply the full force of his engine in a forward direction whereas if the hinged partitions 20—21 are open a certain amount of the air will naturally follow along the duct 19.

30 is an outer shell or casing open at the top as indicated by the reference character 31 through which the air is fed to the propellers 14. By this arrangement the cool air is caused to bathe the exterior of the bag containing the gas and keep the same cool.

32 is a suitable collapsible container carried upon the top of the main bag and communicating therewith by a suitable valve. This container serves to receive the gas from the bag 6 when the same expands due to rise in temperature. When the temperature of the gas falls, due to any fall in the temperature, the gas automatically feeds back through the said valve into the bag 6 again, and for the purpose of facilitating this back feeding of the gas suitable cables such as 33 may be connected thereto and may be passed over a suitable shaft such as 34 provided with a lever 35 within convenient reach of the operator.

I claim:

1. In combination with the supporting bag of a dirigible balloon, a jacket covering the lower portion thereof, propellers within said jacket and deflecting surfaces adjacent to said propellers, and means for adjusting said surfaces so as to receive the air from said propellers upon either of the sides of the same.

2. In combination with the supporting bag of a dirigible balloon, a jacket covering the lower portion thereof, propellers within said jacket and deflecting surfaces adjacent to said propellers, and means for adjusting said surfaces so as to receive the air from said propellers upon either of the sides of the same, a duct through which said air passes extending longitudinally beneath said bag and opened at opposite ends, and means for shifting the end of said duct.

In testimony whereof I affix my signature in presence of two witnesses.

HENRY W. SCHMIDT.

Witnesses:
LOUISE ENDERLE,
THOMAS A. HILL.

Copies of this patent may be obtained for five cents each, by addressing the "Commissioner of Patents, Washington, D. C."